(12) United States Patent
Girondi

(10) Patent No.: US 10,697,411 B2
(45) Date of Patent: Jun. 30, 2020

(54) FUEL FILTER

(71) Applicant: UFI FILTERS (SHANGHAI) Co., Ltd., Shanghai (CN)

(72) Inventor: Giorgio Girondi, Shanghai (CN)

(73) Assignee: UFI FILTERS (SHANGHAI) Co., Ltd., Shanghai (CN)

( * ) Notice: Subject to any disclaimer, the term of this patent is extended or adjusted under 35 U.S.C. 154(b) by 0 days.

(21) Appl. No.: 15/466,866

(22) Filed: Mar. 23, 2017

(65) Prior Publication Data

US 2017/0276106 A1    Sep. 28, 2017

(30) Foreign Application Priority Data

Mar. 23, 2016  (CN) .......................... 2016 1 0169780

(51) Int. Cl.
| | |
|---|---|
| *F02M 37/30* | (2019.01) |
| *B01D 36/00* | (2006.01) |
| *B01D 35/18* | (2006.01) |
| *B01D 35/30* | (2006.01) |

(52) U.S. Cl.
CPC ............. *F02M 37/30* (2019.01); *B01D 35/18* (2013.01); *B01D 35/30* (2013.01); *B01D 36/005* (2013.01); *B01D 2201/50* (2013.01)

(58) Field of Classification Search
None
See application file for complete search history.

(56) References Cited

U.S. PATENT DOCUMENTS

| | | | | | |
|---|---|---|---|---|---|
| 2,103,434 | A | * | 12/1937 | Pennebaker | ........... B01D 27/00 210/185 |
| 2,529,698 | A | * | 11/1950 | Julius | ................... B01D 24/001 210/149 |
| 4,276,161 | A | * | 6/1981 | Matsui | ............... B01D 17/0214 210/86 |

(Continued)

FOREIGN PATENT DOCUMENTS

| | | |
|---|---|---|
| CN | 2212082 | 11/1995 |
| CN | 1630782 | 6/2005 |

(Continued)

OTHER PUBLICATIONS

"Office Action of Korea Counterpart Application", dated Jul. 19, 2018, p. 1-p. 12.

(Continued)

*Primary Examiner* — Robert J Popovics

(74) *Attorney, Agent, or Firm* — JCIPRNET

(57) ABSTRACT

A fuel filter is disclosed herein, comprising: a cup-shaped conductive housing with an opening on one end; a lid, provided at the opening end of the cup-shaped conductive housing to cover the opening, the cup-shaped conductive housing and the lid together defining a fuel filter cavity; and a heater, provided inside the fuel filter cavity, configured to heat fuel inside the fuel filter cavity; wherein the heater includes a grounding electrode that is electrically connected to the cup-shaped conductive housing. The fuel filter as described above electrically connects the conductive housing and the grounding electrode of the heater, creating a connecting path that grounds the conductive housing without need of a separate grounding lead. Therefore, a more compact structure and lower costs are made possible.

6 Claims, 3 Drawing Sheets

(56) References Cited

U.S. PATENT DOCUMENTS

| | | | |
|---|---|---|---|
| 4,338,189 A * | 7/1982 | Johnson, Sr. | B01D 35/185 196/46.1 |
| 4,387,691 A * | 6/1983 | Marcoux | B01D 35/18 123/549 |
| 4,406,785 A * | 9/1983 | Siefer | B01D 35/18 123/557 |
| 4,437,986 A * | 3/1984 | Hutchins | B01D 17/00 210/130 |
| 4,470,301 A * | 9/1984 | Hutchins | B01D 17/0214 210/114 |
| 4,473,054 A * | 9/1984 | Marcoux | B01D 35/18 123/549 |
| 4,476,028 A * | 10/1984 | Harris | B01D 17/0214 210/774 |
| 4,479,477 A * | 10/1984 | Manchester | B01D 35/18 123/549 |
| 4,501,255 A * | 2/1985 | Van Der Ploeg | B01D 35/18 123/557 |
| 4,522,712 A * | 6/1985 | Fischer | B01D 17/0214 123/549 |
| 4,539,108 A * | 9/1985 | Izutani | B01D 35/18 210/104 |
| 4,585,924 A * | 4/1986 | Pakula | B01D 35/18 123/549 |
| 4,596,224 A * | 6/1986 | Prager | B01D 35/18 123/557 |
| 4,603,244 A * | 7/1986 | Genz | F02M 31/125 219/205 |
| 4,818,842 A * | 4/1989 | Walty | F02M 31/125 123/549 |
| 4,844,793 A * | 7/1989 | Izutani | B01D 17/00 210/97 |
| 4,861,966 A * | 8/1989 | Matthiesen | B01D 35/06 123/549 |
| 4,866,250 A * | 9/1989 | Pasbrig | F02M 31/125 123/549 |
| 5,642,718 A | 7/1997 | Nakai et al. | |
| 5,649,514 A | 7/1997 | Okada et al. | |
| 6,177,658 B1 * | 1/2001 | White | B01D 35/18 123/549 |
| 6,328,883 B1 * | 12/2001 | Jensen | B01D 27/00 210/136 |
| 6,709,576 B2 * | 3/2004 | Jokschas | B01D 27/08 210/114 |
| 6,881,328 B2 * | 4/2005 | Dittmann | B01D 36/006 210/104 |
| 6,994,784 B2 * | 2/2006 | Jainek | B01D 35/147 210/149 |
| 7,396,473 B1 * | 7/2008 | Guynn | B01D 29/055 123/196 A |
| 8,034,240 B2 * | 10/2011 | Reiland | B01D 27/08 210/299 |
| 8,038,872 B2 * | 10/2011 | Jokschas | B01D 27/08 210/184 |
| 8,057,687 B2 * | 11/2011 | Jainek | B01D 35/147 210/767 |
| 8,231,779 B2 * | 7/2012 | Jokschas | B01D 27/08 123/557 |
| 8,282,819 B2 * | 10/2012 | Parra Navarrete | B01D 35/18 210/184 |
| 8,617,391 B2 * | 12/2013 | Girondi | B01D 29/055 210/248 |
| 8,641,896 B2 * | 2/2014 | Remacha | B01D 35/18 210/184 |
| 9,080,537 B2 * | 7/2015 | Choi | F02M 37/106 |
| 9,808,750 B2 * | 11/2017 | Klein | B01D 35/18 |
| 10,006,421 B2 * | 6/2018 | Ham | B01D 35/005 |
| 10,245,534 B2 * | 4/2019 | Koonce | B01D 35/005 |
| 10,307,701 B2 * | 6/2019 | Klein | H05B 3/0014 |
| 2002/0038780 A1 * | 4/2002 | Jokschas | B01D 27/06 210/86 |
| 2002/0050469 A1 * | 5/2002 | Jokschas | B01D 27/08 210/114 |
| 2005/0178707 A1 | 8/2005 | Girondi | |
| 2006/0070956 A1 * | 4/2006 | Herrmann | B01D 35/26 210/744 |
| 2006/0249499 A1 * | 11/2006 | Winkler | B60H 1/00464 219/202 |
| 2008/0197064 A1 * | 8/2008 | Blasco Remacha | B01D 35/18 210/184 |
| 2008/0296288 A1 * | 12/2008 | Girondi | B01D 35/18 219/552 |
| 2010/0200485 A1 * | 8/2010 | Parra Navarrete | B01D 35/18 210/184 |
| 2010/0258491 A1 * | 10/2010 | Jokschas | B01D 27/08 210/181 |
| 2012/0037548 A1 * | 2/2012 | Jokschas | B01D 27/08 210/86 |
| 2013/0199979 A1 * | 8/2013 | Jauss | B01D 35/005 210/181 |
| 2013/0292324 A1 * | 11/2013 | Girondi | B01D 29/605 210/450 |
| 2014/0353229 A1 * | 12/2014 | Klein | F02M 31/125 210/184 |
| 2014/0353230 A1 * | 12/2014 | Klein | H05B 3/146 210/185 |
| 2015/0375148 A1 * | 12/2015 | Klein | B01D 46/2414 210/186 |
| 2016/0138538 A1 * | 5/2016 | Ham | B01D 35/005 210/96.1 |
| 2016/0263495 A1 * | 9/2016 | Wyhler | B01D 35/18 |
| 2017/0276106 A1 * | 9/2017 | Girondi | B01D 36/005 |

FOREIGN PATENT DOCUMENTS

| | | |
|---|---|---|
| CN | 204627823 | 9/2015 |
| JP | H0932678 | 2/1997 |
| KR | 100233022 | 12/1999 |
| KR | 100883093 | 2/2009 |
| WO | 2016016172 | 2/2016 |

OTHER PUBLICATIONS

"Office Action of China Counterpart Application", dated Dec. 10, 2018, p. 1-p. 8.

* cited by examiner

FUEL FILTER

CROSS-REFERENCE TO RELATED APPLICATION

This application claims the priority benefit of China application serial no. 201610169780.1, filed on Mar. 23, 2016. The entirety of the above-mentioned patent application is hereby incorporated by reference herein and made a part of this specification.

TECHNICAL FIELD

The present disclosure relates to the field of automobile technology, and particularly, to fuel filters.

BACKGROUND

A fuel filter, due to its high working pressure, typically employs a metal housing. However, static may be present on such a metal housing during the regular use, which easily incurs sparks and invites great safety risks.

To eliminate the static on the metal housing, a conventional approach is to ground the metal housing with a grounding lead, in order to release the accumulated electric charges on the housing in a timely manner to prevent sparking and explosion.

However, the extra arrangement of a grounding lead on the metal housing usually causes the structure to be less compact. Welding errors and breaks of the grounding lead may also occur. Therefore, it is very inconvenient in practice.

SUMMARY OF THE INVENTION

In view of the above, it is therefore necessary to provide a fuel filter that overcomes the challenge in grounding the electrically conductive housing of the fuel filter.

A fuel filter comprises: a cup-shaped conductive housing with an opening on one end; a lid, provided at the opening end of the cup-shaped conductive housing to cover the opening, the cup-shaped conductive housing and the lid together defining a fuel filter cavity; and a heater, provided inside the fuel filter cavity, configured to heat fuel inside the fuel filter cavity; wherein, the heater comprises a grounding electrode that is electrically connected to the cup-shaped conductive housing.

In one of the embodiments, the heater may comprise a heating element and two electrodes. The two electrodes may be configured to supply power to the heating element. One of the two electrodes may be the grounding electrode.

In one of the embodiments, the heating element may be a thermistor device that is clamped between the two electrodes.

In one of the embodiments, the lid may be made of non-conductive plastic material and the heater may be assembled on an internal surface of the lid.

In one of the embodiments, the grounding electrode may comprise an extension extending towards the cup-shaped conductive housing and contacting with the cup-shaped conductive housing after the lid and the cup-shaped conductive housing are assembled.

In one of the embodiments, the extension may be elastic and borne against the cup-shaped conductive housing under the action of the elastic force.

In one of the embodiments, an end of the extension extends to be held tightly between joint surfaces of the cup-shaped conductive housing and the lid.

In one of the embodiments, the internal surface of the lid may be provided with a conductive path extending therefrom to the joint face of the lid that contacts the cup-shaped conductive housing, and the conductive path is connected with the grounding electrode.

In one of the embodiments, the conductive path may be a layer of conductive material coated on the internal surface of the lid.

In one of the embodiments, the conductive path may comprise: an annular conductive gasket held between the joint surfaces of the cup-shaped conductive housing and the lid; and, a sheet-like conductive element extending from the annular conductive gasket along the internal surface of the lid.

In one of the embodiments, the annular conductive gasket may be a seal ring between the joint surfaces of the cup-shaped conductive housing and the lid.

In one of the embodiments, the fuel filter may further comprise a fastening unit configured to fasten the heater to the internal surface of the lid, wherein the fastening unit may comprise: a screw; and a conductive gasket arranged between the grounding electrode of the heater and the conductive path and configured to connect the grounding electrode of the heater and the conductive path.

In one of the embodiments, the conductive gasket may be a spring gasket.

In one of the embodiments, the lid further may comprise an extension extending towards the fuel filter cavity till a bottom of the fuel filter cavity, and at least one water-level sensor may be provided in the extension and extends till the bottom of the fuel filter cavity.

In one of the embodiments, the lid may be provided with a sensor detection hole communicating with the fuel filter cavity, and wherein a sensor may be assembled on the lid and configured to detect fuel parameters in the fuel filter cavity through the sensor detection hole.

In one of the embodiments, the cup-shaped conductive housing may be made of conductive plastic material or metal material.

The fuel filter as described above electrically connects the conductive housing and the grounding electrode of the heater, creating a connecting path that grounds the conductive housing without need of a separate grounding lead. Therefore, a more compact structure and lower costs are made possible.

DETAILED DESCRIPTION OF EMBODIMENTS

Embodiments of the present disclosure will be described in details below with reference to the figures so that the aforementioned aspects, characteristics, and advantages of the present disclosure will be revealed in a more clear and evident manner.

Figure 1:
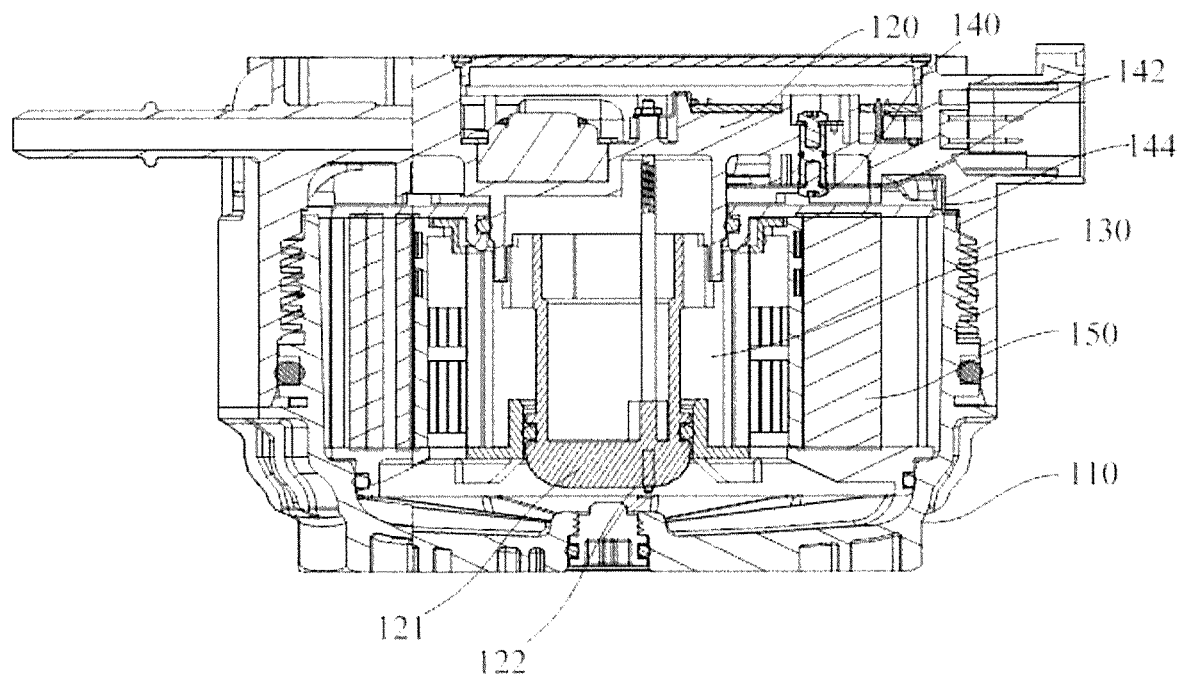
FIG. 1 shows a cross-sectional structural view of a fuel filter according to one of the embodiments.
Figure 2:
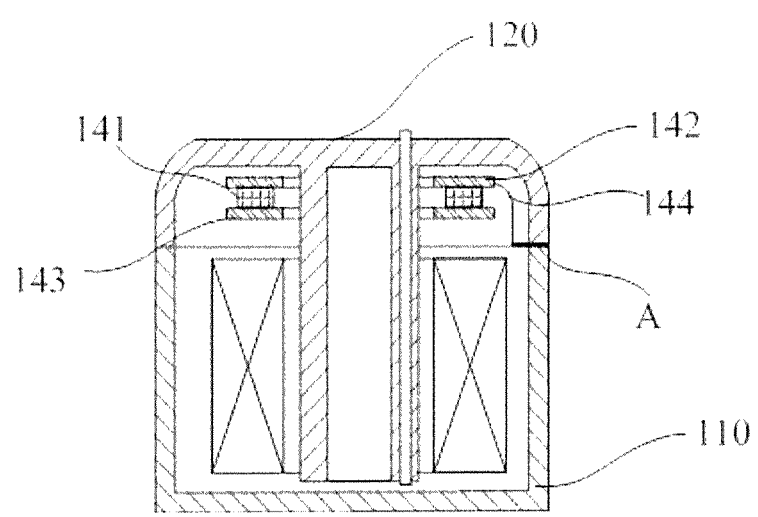
FIG. 2 shows a cross-sectional structural schematic of the fuel filter according to the embodiment shown in FIG. 1.

Please refer to FIG. 1 in combination with FIG. 2. FIG. 1 is a cross-sectional structural view of a fuel filter according to one of the embodiments herein. FIG. 2 shows a cross-sectional structural schematic of the fuel filter according to the embodiment shown in FIG. 1. As shown in FIGS. 1 and 2, a fuel filter 100 includes a cup-shaped conductive housing 110 and a lid 120. The cup-shaped conductive housing 110 has an opening on one end. The lid 120 is provided at the opening end of the cup-shaped conductive housing 110 to cover the opening. The cup-shaped conductive housing 110 and the lid 120 together define a fuel filter cavity 130, in which a filter cartridge 150 is provided. The fuel filter 100 further includes a heater 140, provided inside the fuel filter cavity 130 and configured to heat fuel inside the fuel filter cavity. The heater 140 includes a grounding electrode 142 that is electrically connected to the cup-shaped conductive housing 110. Preferably, the cup-shaped conductive housing 110 may be made of conductive plastic or metal material to control costs. In addition, the lid 120 may be made from non-conductive plastic materials. The heater 140 is assembled on the internal surface of the lid 120. The costs can be greatly reduced as the lid 120 can be made of plastic.

Therefore, the cup-shaped conductive housing 110 can be grounded via the grounding electrode 142 of the heater 140 so as to release the accumulated charges on the cup-shaped conductive housing 110, preventing accumulation of static and the consequential sparking. As a result, risks are avoided. In addition, such structure does not require another grounding lead to be provided on the cup-shaped conductive housing 110. Therefore, a more compact structure of fuel filter 100 is made possible, and the costs are effectively lowered.

As shown in FIG. 2, in this embodiment, the heater 140 may include a heating element 141 and two electrodes, i.e., a first electrode 142 and a second electrode 143. The two electrodes are configured to supply power to the heating element, while one of the two electrodes is the grounding electrode, which can be either the electrode 142 or 143. Such a heater has a simple structure, while one of the regular positive and negative electrodes is grounded as the grounding electrode, without the need of providing an additional grounding electrode, allowing convenient and simple arrangements. Further, the heating element 141 can be a PTC thermistor device that is clamped between the two electrodes. A PTC thermistor device is a commonly used heating element. Therefore, such a structure is even simpler for arrangement and replacement and more effective for cost control.

Figure 3:
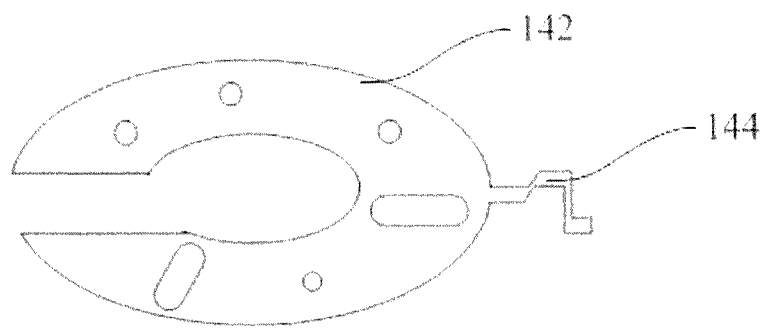
FIG. 3 shows a structural schematic of a grounding electrode of the heater of the fuel filter according to the embodiment shown in FIG. 2.

Preferably, the grounding electrode 142 of the heater 140 includes an extension 144 extending towards the cup-shaped conductive housing 110, and contacting with the cup-shaped conductive housing 110 after the lid 120 and the cup-shaped conductive housing 110 are assembled and connected to each other. As a result, the cup-shaped conductive housing 110 is connected to the grounding electrode 142 of the heater 140 via the extension 144 to release static. In this embodiment, an end of the extension 144 extends to be held tightly between the joint surfaces A of the cup-shaped conductive housing 110 and the lid 142. As a result of the tight holding of the cup-shaped conductive housing 110 and the lid 120, the connection between the cup-shaped conductive housing 110 and the grounding electrode 142, as well as safety, is ensured. The lid 120 couples with the opening end of the cup-shaped conductive housing 110 to seal the opening of the cup-shaped conductive housing 110. The joint surfaces A are the annular contact surfaces of the lid 120 and the cup-shaped conductive housing 110 when the lid 120 seals the cup-shaped conductive housing 110. Please refer to FIG. 3, which shows a structural schematic of a grounding electrode 142 of the heater of the fuel filter according to the embodiment shown in FIG. 2. As shown in FIG. 3, the grounding electrode 142 includes an extension 144, which contacts with the cup-shaped conductive housing 110 after the lid 120 and the cup-shaped conductive housing 110 are assembled.

Figure 4:
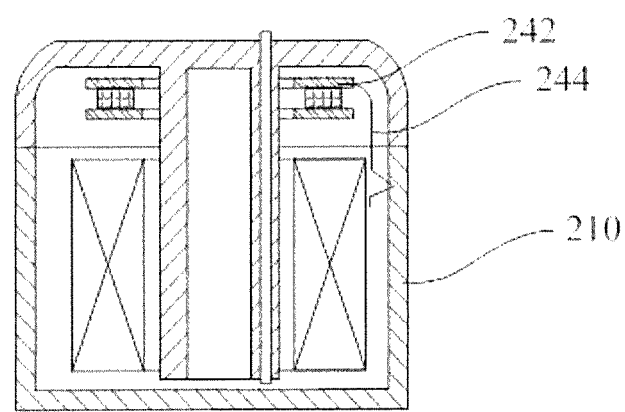
FIG. 4 shows a cross-sectional structural schematic of the fuel filter according to yet another embodiment.

Please refer to FIG. 4, which shows a structural schematic of the fuel filter according to yet another embodiment. As shown in FIG. 4, in this embodiment, the extension 244 of the grounding electrode 242 is elastic and borne against the cup-shaped conductive housing 210 under the action of the elastic force to ensure the connection between the cup-shaped conductive housing 210 and the grounding electrode 242 as well as safety. Such an extension of the grounding electrode is more convenient in disassembly as it does not require being held between the joint surfaces of the cup-shaped conductive housing and the lid.

Figure 5:
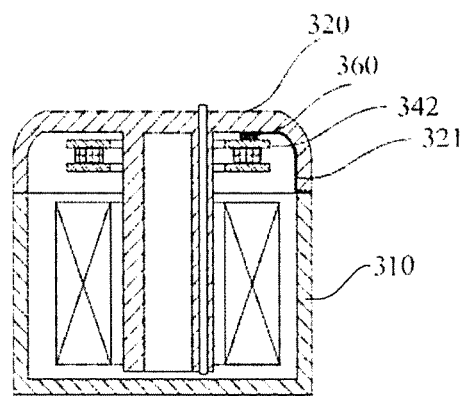
FIG. 5 shows a cross-sectional structural schematic of the fuel filter according to another embodiment.

Please refer to FIG. 5, which shows a cross-sectional structural schematic of the fuel filter according to another embodiment. In this embodiment, the internal surface of the lid 320 is provided with a conductive path 321 extending therefrom to the joint surface of the lid 320 that is in contact with the cup-shaped conductive housing 310, and the conductive path 321 is connected with the grounding electrode 342. In this embodiment, the fuel filter further includes a conductive gasket arranged between the grounding electrode 342 of the heater and the conductive path 321 and configured to connect the grounding electrode 342 of the heater with the conductive path 321. Since the heater is normally a standard part, changing the structure of the heater may typically lead to higher costs. However, by arranging a conductive path on the lid, the grounding electrode of the heater is connected to the cup-shaped conductive housing via the conductive path, so that the static on the cup-shaped conductive housing can be released via the grounding electrode of the heater without changing the structure of the heater. Therefore, the costs are effectively lowered.

In this embodiment, the fuel filter further includes a fastening unit configured to fasten the heater to the internal surface of the lid, wherein the fastening unit includes a screw and a conductive gasket, the conductive gasket being the conductive gasket 360 arranged between the grounding electrode 342 of the heater and the conductive path 321 as described above. The screw is configured to fasten the heater onto the lid. The conductive gasket 360 is arranged between the grounding electrode 342 of the heater and the conductive path 321 and is configured to connect the grounding electrode 342 of the heater with the conductive path 321, so that the conductive gasket 360 connects the conductive path 321 provided on the lid and the grounding electrode 342 of the heater, while the conductive path 321 on the lid is connected with the cup-shaped conductive housing. As a result, a grounding path, in which the cup-shaped conductive housing is connected to the grounding electrode 342 via the conductive path 321 and through the conductive gasket 360, is formed to ground the cup-shaped conductive housing. A fuel filter thus formed allows a compact structure and low costs.

Preferably, the conductive gasket is a spring gasket to ensure the effective connection between the grounding electrode of the heater and the conductive path.

Preferably, the conductive path is a layer of conductive material coated on the internal surface of the lid. As such, the conductive path is integrated on the lid so as to reduce components of the fuel filter and facilitate assembling. Also, it helps ensure the connection among the conductive path, the grounding electrode, and the cup-shaped conductive housing.

Figure 6:
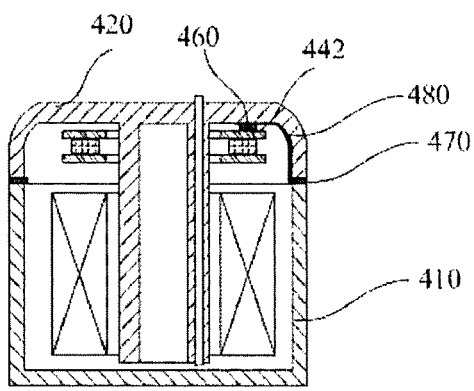
FIG. 6 shows a cross-sectional structural schematic of the fuel filter according to yet another embodiment.

Please refer to FIG. 6, which shows a cross-sectional structural schematic of the fuel filter according to yet another embodiment. In this embodiment, the fuel filter may further include: an annular conductive gasket 470 held between the joint surfaces of the cup-shaped conductive housing 410 and the lid 420; and, a sheet-like conductive element 480 extending from the annular conductive gasket 470 along the internal surface of the lid 420. The annular conductive gasket 470 is held between the joint surfaces of the cup-shaped conductive housing 410 and the lid 420, connecting to the cup-shaped conductive housing 410 at one end and extending towards the internal surface of the lid 420 via the sheet-like conductive element 480 to connect with the grounding electrode 442 of the heater. As a result, a connection between the cup-shaped conductive housing 410 and the grounding electrode 442 is formed to provide a grounding path that grounds the cup-shaped conductive housing. In this embodiment, the fuel filter may further include a conductive gasket 460 that is provided between the grounding electrode 442 of the heater and the sheet-like conductive element 480 and is configured to connect the grounding electrode 442 and the sheet-like conductive element 480. Therefore, the connection between the grounding electrode 442 and the cup-shaped conductive housing 410 is further ensured.

Preferably, the annular conductive gasket 470 may be a seal ring between the joint surfaces of the cup-shaped conductive housing 410 and the lid 420. Therefore, a separate seal ring is not necessary. The cup-shaped conductive housing is grounded while the sealing is provided between the lid and the cup-shaped conductive housing, rendering a more compact structure.

In this embodiment, the fuel filter may further include a fastening unit configured to fasten the heater to the internal surface of the lid, wherein the fastening unit includes a screw and a conductive gasket, the conductive gasket being the conductive gasket 460 arranged between the grounding electrode 442 of the heater and the sheet-like conductive element 480 as described above. The screw is configured to fasten the heater onto the lid. The conductive gasket 460 is arranged between the grounding electrode 442 of the heater and the sheet-like conductive element 480 and configured to connect the grounding electrode 442 of the heater with the sheet-like conductive element 480, so that the conductive gasket 460 connects the sheet-like conductive element 480 provided on the lid and the grounding electrode 442 of the heater, while the sheet-like conductive element 480 on the lid is connected with the cup-shaped conductive housing. As a result, a grounding path, in which the cup-shaped conductive housing is connected to the grounding electrode 442 via the annular conductive gasket 470, sheet-like conductive element 480, and through the conductive gasket 460, is formed to ground the cup-shaped conductive housing. A fuel filter thus formed allows a compact structure and low costs. Preferably, the conductive gasket 460 is a spring gasket to ensure the effective connection between the grounding electrode 442 of the heater and the sheet-like conductive element 480.

Please refer to FIGS. 1, 2, 4, 5, and 6 again. Preferably, the lid 120 of the fuel filter 100 as described in all above embodiments may further includes an extension 121 extending towards the fuel filter cavity 130 till the bottom of the fuel filter cavity 130, and at least one water-level sensor 122 is provided in the extension 121 and extends till the bottom of the fuel filter cavity 130. The water-level sensor 122 is integrated onto the lid 120 so that the structure of the fuel filter 100 is more compact and the installation procedure is simplified. The lid may be further provided with a sensor detection hole communicating with the fuel filter cavity. The sensor is assembled on the lid and detects fuel parameters in the fuel filter cavity through the sensor detection hole. Therefore, the fuel parameters in the fuel filter cavity can be conveniently detected. The sensor can be a pressure sensor or a temperature sensor. As a result, the fuel filter is more effectively integrated and more compact in structure.

The technical features in the embodiments above may be implemented in any combination. For the purpose of simplicity, not all combinations are described herein. However, such combination should all be considered within the scope of the present invention provide that there is no contradiction.

The detailed embodiments described herein are only for the purpose of illustrating the present invention, and are not intended to limit the scope of the present invention in any way. It would be understood by a person skilled in the art that various changes and modifications can be made to the embodiments described herein without departing from the scope and spirit of the present invention. Such changes and modifications are contemplated by the present invention, the scope of which should only be defined by the following claims.

What is claimed is:

1. A fuel filter, comprising:
a cup-shaped conductive housing with an opening on one end;
a lid provided at the opening end of the cup-shaped conductive housing to cover the opening, the cup-shaped conductive housing and the lid together defining a fuel filter cavity for housing a filter element; and
a heater provided inside the fuel filter cavity for heating fuel inside the fuel filter cavity,
wherein the heater comprises a grounding electrode comprising an extension which is extending towards the cup-shaped conductive housing, and contacting the cup-shaped conductive housing after the lid and the cup-shaped conductive housing are assembled;
the grounding electrode is electrically connected to the cup-shaped conductive housing via the extension, so that the static on the cup-shaped conductive housing is released via the grounding electrode of the heater.

2. The fuel filter of claim 1, wherein the extension is elastic and borne against the cup-shaped conductive housing under the action of the elastic force.

3. The fuel filter of claim 1, wherein an end of the extension extends to be held tightly between joint surfaces of the cup-shaped conductive housing and the lid.

4. The fuel filter of claim 1, wherein the cup-shaped conductive housing is made of conductive plastic material or metal material.

5. The fuel filter of claim 1, wherein the lid further comprises an extension extending towards the fuel filter cavity till a bottom of the fuel filter cavity, and at least one water-level sensor is provided in the extension of the lid and extends till the bottom of the fuel filter cavity.

6. The fuel filter of claim 1, wherein the lid is provided with a sensor detection hole communicating with the fuel filter cavity, and wherein a sensor is assembled on the lid for detecting fuel parameters in the fuel filter cavity through the sensor detection hole.

* * * * *